US008859697B2

(12) United States Patent
Meier et al.

(10) Patent No.: US 8,859,697 B2
(45) Date of Patent: Oct. 14, 2014

(54) PROCESS FOR PREPARING A (METH)ACRYLATE COPOLYMER CONTAINING TERTIARY AMINO GROUPS BY FREE-RADICAL POLYMERIZATION IN SOLUTION

(75) Inventors: Christian Meier, Darmstadt (DE); Andreas Weber, Frankfurt (DE); Johannes Vorholz, Alxenau (DE); Alpertunga Kueksal, Nuremberg (DE); Andreas Klosendorf, Bad Schwalbach (DE); Pamela Boehmann, Weiterstadt (DE); Marcus Denger, Brensbach (DE); Norbert Hoffmann, Griesheim (DE); Nikolaos Papadopoulos, Ginsheim-Gustavsburg (DE)

(73) Assignee: Evonik Röhm GmbH, Darmstadt (DE)

( * ) Notice: Subject to any disclaimer, the term of this patent is extended or adjusted under 35 U.S.C. 154(b) by 10 days.

(21) Appl. No.: 13/876,277

(22) PCT Filed: Oct. 13, 2010

(86) PCT No.: PCT/EP2010/065328
§ 371 (c)(1),
(2), (4) Date: Mar. 27, 2013

(87) PCT Pub. No.: WO2012/048740
PCT Pub. Date: Apr. 19, 2012

(65) Prior Publication Data
US 2013/0190468 A1 Jul. 25, 2013

(51) Int. Cl.
*C08F 2/06* (2006.01)
*C08F 220/34* (2006.01)
*C08F 2/04* (2006.01)
*C08F 220/18* (2006.01)

(52) U.S. Cl.
CPC .............. *C08F 2/04* (2013.01); *C08F 220/34* (2013.01); *C08F 220/18* (2013.01)
USPC ......... 526/212; 526/312; 526/328; 526/328.5

(58) Field of Classification Search
CPC ............ C08F 2/06; C08F 20/14; C08F 20/18; C08F 20/34; C08F 220/14; C08F 220/18; C08F 220/34
See application file for complete search history.

(56) References Cited

U.S. PATENT DOCUMENTS 6,034,183 A * 3/2000 Okumura et al. ............. 525/293
6,624,210 B1 9/2003 Petereit et al.
8,431,157 B2 4/2013 Lizio et al.
2005/0158581 A1 * 7/2005 Fryd et al. .................... 428/690
2013/0096272 A1 4/2013 Meier et al.

FOREIGN PATENT DOCUMENTS

| CN | 101103055 A | 1/2008 |
| DE | 199 18 435 | 1/2000 |
| EP | 0 884 333 | 12/1998 |
| JP | 53-132091 | 11/1978 |
| JP | 7-18014 A | 1/1995 |
| JP | 09-100387 | 4/1997 |
| JP | 2002-167316 A | 6/2002 |
| JP | 2003-252926 A | 9/2003 |
| JP | 2009-242686 A | 10/2009 |

OTHER PUBLICATIONS

International Search Report Issued Nov. 22, 2010 in PCT/EP10/65328 Filed Oct. 13, 2010.
Combined Chinese Office Action and Search Report issued May 12, 2014 in Patent Application No. 201080069513.8 (with English language translation).
Japanese Office Action issued in corresponding Japanese patent application No. 2013-533096 dated Apr. 14, 2014.

* cited by examiner

*Primary Examiner* — Vu A Nguyen
(74) *Attorney, Agent, or Firm* — Oblon, Spivak, McClelland, Maier & Neustadt, L.L.P.

(57) ABSTRACT

The invention relates to a process for preparing a (meth)acrylate copolymer containing tertiary amino groups by free-radical polymerization in solution from a monomer mixture selected from a) 30 to 70% by weight of a $C_1$-$C_4$-alkyl ester of acrylic acid or methacrylic acid and b) 70 to 30% by weight of an alkyl ester of acrylic acid or methacrylic acid with a tertiary amino group in the alkyl radical and c) 0 to 10% of further copolymerizable vinyl monomers, whereby one or more polymerization initiators, optionally one or more molecular weight regulators and one or more solvents or of a solvent mixture are added to the monomer mixture to give a polymerization mixture, which is polymerized at temperatures from 30 to 120° C. over a period of 2 to 24 hours, where the polymerization mixture is finally polymerized to give a polymerization syrup with a conversion of the monomers to the copolymer of at least 99% by weight, where the polymerization syrup is subsequently degassed by distillation or by extrusion and the degassed polymerization syrup is further comminuted to a copolymer preparation in the form of a granulate or powder, where the copolymer preparation is characterized by a molecular weight ($M_w$) of 25.000 to 75.000 g/mol a polydispersity index of 2.1 to 2.9 and a residual solvent concentration of less than 1.000 ppm by weight.

14 Claims, No Drawings

PROCESS FOR PREPARING A (METH)ACRYLATE COPOLYMER CONTAINING TERTIARY AMINO GROUPS BY FREE-RADICAL POLYMERIZATION IN SOLUTION

TECHNICAL BACKGROUND

U.S. Pat. No. 5,804,676 describes a process for preparing a polymer from a monomer mixture comprising 75% by weight or more of methyl methacrylate and 25% by weight or less of an alkyl acrylate in a homogeneous solution state in the presence of a polymerization initiator and a chain transfer agent. The polymerizate may contain 5-55% by weight of the monomer and 5 to 65% by weight of the solvent. The polymerizate containing volatiles is directly fed to a feed opening of an extruder having a barrel, a screw and a plurality of vents and the barrel being at a temperature of 170 to 270° C. The polymerizate is extruded through the extruder while substantially all volatiles are separated and recovered through a first vent of the extruder and remaining volatiles are separated through being removed trough at least one other vent disposed downstream of the first vent. The thermal decomposition rate is 3.0% by weight or less.

EP 0 694 565 A describes a process for the homogeneous polymerization of water insoluble polymers containing greater than 50% by weight of monomers selected from the group consisting of $C_1$-$C_{18}$ alkyl acrylate or methacrylate esters, N-substituted acryl or methacrylamides and mixtures thereof in substantially non-aqueous solutions. Water soluble polymerization initiators like for instance ammonium persulfate are dissolved in sufficient amount of water whereby the amount of water does not exceed 25% by weight of the total solution. The polymers prepared by this process are devoid of undesirable initiator decomposition by-products.

U.S. Pat. No. 6,624,210 B1 describes a coating and excipient agent for oral or dermal dosage forms. The coating and excipient agent is comprises a copolymer consisting of radically polymerized C1-C4 esters of acrylic or methacrylic acid and additional (meth)acrylate monomers having functional tertiary amino groups, which may be EUDRAGIT® E in powdered form. It is generally mentioned that the copolymers may be obtained in a manner known in itself by radical, bulk, solution, bead or emulsion polymerization.

WO 2007/082868A1 relates to processes for preparing polymers which contain 50-90% by weight of at least one ester of (meth)acrylic acid, 5-50% by weight of at least one olefinically unsaturated, free-radically polymerizable anionogenic or anionic compound and further free-radically polymerizable compound in copolymerized form, by free-radical polymerization in a solution comprising alcohol, wherein the polymerization initiator used is at least one water-soluble initiator.

WO 2007/113129A1 relates to processes for preparing polymers by free-radical polymerization in a solution, which is characterized in that the polymerization initiator used is an ethanol-soluble initiator and the solution polymerization is performed in an alcoholic solvent which contains from 5 to 50% by weight of water.

CN 101475662A relates to a process for preparing polymethacrylamide ester of low membrane forming temperature and moderate permeability for pharmaceutical use. Such a polymer may be composed from ethyl acrylate, butyl acrylate, methyl methacrylate and trimethylammoniumethyl methacrylate chloride. The monomer composition to be polymerized is dissolved in comparably small amounts of solvents, 5-15% by weight.

PROBLEM AND SOLUTION

It is known, for instance from U.S. Pat. No. 6,624,210 B1, that (meth)acrylate copolymers containing tertiary amino groups, especially those from the well known type of EUDRAGIT® E, may be produced by radical polymerization in solution. However in the past these kinds of copolymers have permanently been produced by bulk polymerization in order to meet securely continuous high pharmaceutical standards which are required by authorities and customers. Details for a polymerization in solution which provide copolymer products which meet the same pharmaceutical requirements as the products which are commercially available are not reported so far. Thus it was an object of the present invention to provide a process for preparing a (meth)acrylate copolymer containing tertiary amino groups by free-radical polymerization in solution which meet the actual high pharmaceutical standards for the end product, especially for instance in respect to the molecular weight range, the polydispersity index range and the residual solvent and monomer concentrations. Since quite different types of monomers to be polymerized are employed in the process, the inventors had to adjust and to fix a lot of individual process steps at the same time to meet the pharmaceutical requirements. Thus the process reported and claimed here goes beyond the common knowledge of a person skilled in the art.

The problem was solved by a

A process for preparing a (meth)acrylate copolymer containing tertiary amino groups by free-radical polymerization in solution from a monomer mixture selected from a) 30 to 70% by weight of a $C_1$-$C_4$-alkyl ester of acrylic acid or methacrylic acid and b) 70 to 30% by weight of an alkyl ester of acrylic acid or methacrylic acid with a tertiary amino group in the alkyl radical and c) 0 to 10% of further copolymerizable vinyl monomers, whereby one or more polymerization initiators, optionally one or more molecular weight regulators and one or more solvents or of a solvent mixture are added to the monomer mixture to give a polymerization mixture, which is polymerized at temperatures from 30 to 120° C. over a period of 2 to 24 hours, where for the polymerization mixture at least 98% by weight of the following total amounts of components are used, 40 to 75% by weight of the monomer mixture, 0.01 to 5% by weight of the one or more polymerization initiators 0 to 2% by weight of the one or more molecular weight regulators, 25 to 50% by weight of the one or more solvent or the solvent mixture, wherein the monomers of the monomer mixture, the polymerization initiators and the molecular weight regulators dissolve, where the polymerization mixture is finally polymerized to give a polymerization syrup with a conversion of the monomers to the copolymer of at least 99% by weight, where the polymerization syrup is subsequently degassed by distillation or by extrusion and the degassed polymerization syrup is further comminuted to a copolymer preparation in the form of a granulate or powder, where the copolymer preparation is characterized by a a molecular weight ($M_w$) of 25.000 to 75.000 g/mol a polydispersity index of 2.1 to 2.9 and a residual solvent concentration of less than 1.000 ppm by weight.

DETAILS OF THE INVENTION

The invention relates to a process for preparing a (meth)acrylate copolymer containing tertiary amino groups by free-radical polymerization in solution from a monomer mixture selected from
- a) 30 to 70, preferably 40 to 60% by weight of a $C_1$-$C_4$-alkyl ester of acrylic acid or methacrylic acid and
- b) 70 to 30, preferably 60 to 40% by weight of an alkyl ester of acrylic acid or methacrylic acid with a tertiary amino group in the alkyl radical and
- c) 0 to 10% of further copolymerizable vinyl monomers (different from the monomers a) or b))

whereby one or more polymerization initiators, optionally one or more molecular weight regulators and one or more solvents or of a solvent mixture are added to the monomer mixture to give a polymerization mixture, which is polymerized at temperatures from 30 to 120° C. over a period of 2 to 24 hours, where for the polymerization mixture at least 98% by weight of the following total amounts of components are used, 40 to 75% by weight of the monomer mixture, 0.01 to 5, preferably 0.01 to 0.5% by weight of the one or more polymerization initiators, 0 to 2, preferably 0.1 to 2% by weight of the one or more molecular weight regulators, 25 to 50% by weight of the one or more solvents or the solvent mixture, wherein the monomers of the monomer mixture, the polymerization initiators and the molecular weight regulators dissolve, where the polymerization mixture is finally polymerized to give a polymerization syrup with a conversion of the monomers to the copolymer of at least 99% by weight, where the polymerization syrup is subsequently degassed by distillation or by extrusion and the degassed polymerization syrup is further comminuted to a copolymer preparation in the form of a granulate or powder, where the copolymer preparation is characterized by a molecular weight ($M_w$) of 25.000 to 75.000 g/mol a polydispersity index of 2.1 to 2.9 and a residual solvent concentration of less than 1.000 ppm by weight.

Monomer Mixture

The monomer mixture selected from
- a) 30 to 70, preferably 40 to 60% by weight of a $C_1$-$C_4$-alkyl ester of acrylic acid or methacrylic acid and
- b) 70 to 30, preferably 60 to 40% by weight of an alkyl ester of acrylic acid or methacrylic acid with a tertiary amino group in the alkyl radical and
- c) 0 to 10, 1 to 5% or up to 10, up to 5, up to 2% by weight or any further copolymerizable vinyl monomers (different from the monomers a) or b))

The copolymer may preferably comprise or consist essentially or exclusively of 90, 95 or 99 to 100% by weight of the monomers mentioned under a) and b).

Preferably the monomer mixture is consisting of 10-40, preferably 20 to 30% by weight of methyl methacrylate, 10-40, preferably 20 to 30% by weight of butyl methacrylate and 30-70, preferably 40 to 60% by weight of dimethylaminoethyl methacrylate.

Monomers a)

The term "a $C_1$-$C_4$-alkyl ester of acrylic acid or methacrylic acid" shall mean one or more $C_1$-$C_4$-alkyl ester of acrylic acid or methacrylic acid.

$C_1$-$C_4$-alkyl ester of acrylic acid or methacrylic acid are methyl acrylate, ethyl acrylate, propyl acrylate, butyl acrylate, methyl methacrylate, ethyl methacrylate, propyl methacrylate and butyl methacrylate.

Monomers b)

The term "an alkyl ester of acrylic acid or methacrylic acid with a tertiary amino group in the alkyl radical" shall mean one or more alkyl esters of acrylic acid or methacrylic acid with a tertiary amino group in the alkyl radical.

Suitable alkyl ester of acrylic acid or methacrylic acid with a tertiary amino group in the alkyl radical are detailed in U.S. Pat. No. 4,705,695, column 3 line 64 to column 4 line 13. Mention should be made in particular of dimethylaminoethyl acrylate, 2-dimethylaminopropyl acrylate, dimethylaminopropyl methacrylate, dimethylaminobenzyl acrylate, dimethylaminobenzyl methacrylate, (3-dimethylamino-2,2-dimethyl)propyl acrylate, dimethylamino-2,2-dimethyl)propyl methacrylate, (3-diethylamino-2,2-dimethyl)propyl acrylate and diethylamino-2,2-dimethyl)propyl methacrylate. Particular preference is given to dimethylaminoethyl methacrylate.

Optional Monomers c)

The term "further copolymerizable vinyl monomers" shall mean one or more further copolymerizable vinyl monomers.

The copolymer may preferably comprise or consist essentially or exclusively of 90, 95 or 99 to 100% by weight of the monomers mentioned under a) and b).

However, optionally it may be possible, without this necessarily leading to an impairment of the essential properties, for small amounts in the range from 0 to 10, 1 to 5% or up to 10, up to 5, up to 2% by weight of further copolymerizable vinyl monomers c), which are different from the monomers mentioned under a) and b), capable of vinylic copolymerization additionally to be present, such as, for example acrylic acid, methacrylic acid, in general (meth)acrylic compounds with functional amide or hydroxylgroups, for instance methacrylamid or hydroxyethyl methacrylate, vinylpyrrolidone, vinylmalonic acid, styrene, vinyl alcohol, vinyl acetate and/or derivatives thereof. Most preferred no essential amounts, less than 2% by weight or no further copolymerizable vinyl monomers at all are present in the copolymer to be polymerized.

Preferred Monomer Mixtures

Preferably the monomer mixture may consist of 10-40, preferably of 20 to 30% by weight of methyl methacrylate, 10-40, preferably of 20 to 30% by weight of butyl methacrylate and 30-70, preferably of 40 to 60% by weight of dimethylaminoethyl methacrylate.

The most preferred the monomer mixture is consisting of 25% by weight of methyl methacrylate, 25% by weight of butyl methacrylate and 50% by weight of dimethylaminoethyl methacrylate. The resulting copolymer may be used for pharmaceutical purposes and is called the "amino methacrylate copolymer (USP/NF)", "basic butylated methacrylate copolymer (Ph. Eur)" or "aminoalkyl Methacrylate Copolymer E (JPE)" which are of the EUDRAGIT® E type.

Polymerization Mixture

One or more polymerization initiators, one or more molecular weight regulators and one or more solvents or of a solvent mixture, are added to the monomer mixture to give a polymerization mixture, where for the polymerization mix ture at least 98% by weight of the following total amounts of components are used (were used) or consumed (respectively),
- 40 to 75, preferably 50 to 70% by weight of the monomer mixture,
- 0.01 to 5, preferably 0.01 to 0.5, more preferably 0.05 to 0.3% by weight of the one or more polymerization initiators,
- optionally 0 to 2, preferably 0.1 to 2, more preferably 0.2 to 1% by weight of the one or more molecular weight regulators (chain transfer agents),
- 25 to 50, preferably 35 to 45% by weight of the one or more solvent or the solvent mixture, wherein the monomers of the monomer mixture, the polymerization initiators and the molecular weight regulators dissolve, The term "used" shall express that the components were initially used during the polymerization process as a whole. The one or more solvent or the solvent mixture is still present at the end of the polymerization process before the volatile substances are removed.

However essential amounts of monomers, the one or more polymerization initiators and the one or more molecular weight regulators that were initially given (were used) in the indicated amounts to the polymerization mixture have been reacted during the polymerization process and thus are no more quantitative present after at the end of the polymerization process. These substances that were used have been consumed during the polymerization process.

The components of the polymerization mixture usually add up to at least 98, preferably at least 99% by weight. In this case up to 2, preferably up to 1% of additional substances, different from the components explicitly mentioned, like for instance some kind of additives, like UV absorbers, dyes or colorants, may be present. The additional substances are not critical for the invention. However most preferred the components add up to 100% by weight.

Solvents

The polymerization mixture may comprise at the end of the polymerization process 25 to 50, preferably 35 to 45% by weight of the one or more solvent or the solvent mixture.

The solvent or the solvent mixture may comprise or consist of at least more than 95% by weight, preferably at least more than 98% by weight, most preferably to 100% of a solvent or a mixture of solvents, which may be selected from the group of ethanol, methanol, iso-propyl alcohol, n-butyl alcohol, iso-butyl alcohol, tetrahydrofuran, methyl ethyl ketone, methyl iso-butyl ketone, dioxan, acetone, ethyl acetate or butyl acetate and less than 5% by weight, preferably less than 2% by weight of other solvents, like for instance water.

The solvent or the solvent mixture may preferably comprise or consist of to at least 98% by weight of iso-propyl alcohol, less than 2% by weight of water and less than 1% by weight of aliphatic solvents. Most preferably iso-propyl alcohol is used as the sole solvent.

The one or more solvent or the solvent mixture is preferably chosen in a way that the monomers of the monomer mixture, the polymerization initiator(s) and the molecular weight regulator(s) are capable to be dispersed or dissolved therein at the concentrations and conditions in which they are used during the process.

The monomer solvent mixture employed in the inventive process enables cooling via evaporation and condensation of the boiling components, mainly solvents.

Polymerization Initiators

The term "polymerization initiator" means a substance capable of initiating the free-radical polymerization of vinylic monomers by thermal or by spectral activation.

The polymerization mixture comprises or contains one or more polymerization initiators. Preferably the polymerization initiator(s) are chosen, so that they discompose near the boiling point of the solvents used.

Preferably the polymerization initiators which may be used are not water soluble. Water soluble initiators are at 20° C. and 1013 mbar to at least 1 g, preferably to at least 10 g soluble in 1 liter of water.

Suitable polymerization initiators in the sense the invention may be in general initiators of the peroxide- or of the azo-type. Certain suitable polymerization initiators in the sense the invention may be azobisisobutyronitrile (AIBN), dimethyl-2-2'-azobis-isobutyrate, tert-butylperpivalate or tert-butylper-2-ethylhexaonat or mixtures thereof.

Molecular Weight Regulators

The polymerization mixture may optionally comprise or contain one or more molecular weight regulators (chain transfer agents).

The term "molecular weight regulators" means a substance capable of limiting the molecular weight of a polymer during free-radical polymerization of vinylic monomers by chain transfer reactions.

A suitable molecular weight regulator is for instance n-butylmercaptan, n-dodecylmercaptan, 2-mercaptoethanol or 2-ethylhexylthioglycolate, most preferred is dodecylmercaptan.

Polymerization

The polymerization mixture may be polymerized at temperatures from 30 to 120, preferably 50 to 100, more preferably 55 to 90° C.

The polymerization mixture may be polymerized over a period of 2 to 24, preferably 4 to 16 or 6 to 10 hours.

The polymerization may be carried out using the following steps

A polymerization reactor, for instance a 100 l stirred vessel, is inertized by addition of an inert gas like argon. Stirring may be around 60 to 80 rpm.

The monomer mixture, for example around 30 kg, without addition of solvent or with only little addition of solvent (less than 8% by weight) is filled in the reactor.

The temperature of the reactor is raised to about 60 to 100° C.

When the inside temperature of the reactor has reached about 52 to 58° C. the one or more molecular weight regulators (chain transfer agents) are added, for instance about 0.1 to 0.3 kg.

A solution containing the one or more polymerization initiators in a solvent mixture is added. The solvent content of the polymerization initiator solvent mixture may be 90 to 95% by weight of solvent. The initial dosage of the polymerization initiator solvent mixture (initiator fed) may be for instance 0.05 to less than 0.1 kg/h. After one hour the initiator fed may be increased to 0.1 to less than 0.3 kg/h and after 2 to 3 hours to 0.3 to 0.5 kg/h.

The one or more solvents or the solvent mixture, for instance isopropanol, may be simultaneously added in a dosage of 2 to 4 kg/h (solvent fed).

The dosing of the initiator fed and of the solvent fed may be stopped after 4 to 8 or 5 to 6 hours.

The polymerization reaction may be regarded as finished after 6 to 10, or 7 to 9 hours, when the polymerization mixture has become a high viscous polymerization syrup with a conversion rate of the monomers to the copolymer of at least 99% by weight.

Polymerization Syrup

The polymerization mixture is finally polymerized to give a polymerization syrup with a conversion rate of the monomers to the copolymer of at least 99% by weight conversion.

Degassing Step

The polymerization syrup is subsequently degassed by distillation or by extrusion to remove the volatile substances. The volatile substances to be removed may be the solvent(s), residual traces of monomers which have not been polymerized and also remaining traces and reaction products of the initiator(s) or the molecular weight regulator(s).

Preferably the degassing step is performed in a co-rotating or in a counter-rotating twin screw extruder with one or more, preferred at least two degassing zones at temperatures of 100 to 200° C. with the 2 to 10% by weight of water added as an entrainer (carrier) to the polymer syrup.

The screws of the twin screw extruder may be co-rotating or in a counter-rotating.

Preferably the surfaces of the extruder screws are free from iron or contain only a low amount of iron.

Preferably the surfaces of the extruder screws are refined. Preferably the surfaces of the extruder screws are chromated or chrome-nitrated or titan-nitrated.

This has the advantage or supports that the yellowness index (extinction at 420 nm) of the polymer product is comparably low, preferably less than 0.1, preferably less than 0.05.

The screws of the twin screw extruder may be co-rotating or in a counter-rotating. The use of the entrainer is of advantage since it cools the mass down and reduces friction. Thus the degradation of the copolymer is less compared to an extrusion without the addition of water as entrainer.

Copolymer Preparation

The degassed polymerization syrup may be further comminuted to a copolymer preparation in the form of a granulate or powder. The term "granulate" shall also include porous, foam like structured granulates.

The copolymer preparation may be analysed by know analytical methods and may characterized by a
- a molecular weight ($M_w$) of 25.000 to 75.000, preferably 40.000 to 60.000 g/mol,
- a polydispersity index of 2.1 to 2.9,
- a residual solvent concentration of less than 1.000 ppm, preferably less than 500 ppm by weight,
- an extinction at 420 nm (yellowness index) of less than 0.1, preferably less than 0.05,
- a total residual monomer content of less than 1.000 ppm), preferably less than 500 ppm by weight.

Analytical Methods

Analytical methods to determine the molecular weight ($M_w$=average weight molecular weight) are well known to a skilled person. In general the molecular weight $M_w$ can be determined by gel permeation chromatography or by a light-scattering method (see, for example, H. F. Mark et al., Encyclopedia of Polymer Science and Engineering, 2nd Edition, Vol. 10, pages 1 ff., J. Wiley, 1989).

Most preferred the molecular weight ($M_w$=average weight molecular weight) of the polymers described here is determined by means of size exclusion chromatography (SEC) using polyester-based packaging as the stationary phase and dimethylacetamide (DMAC) as stationary phase as described in detail in Adler et al. (2005): *Molar mass characterization of hydrophilic polymers, 2 Size exclusion chromatography of cationic (meth)acrylate copolymers, e-Polymers*, no. 057, p. 1-11 (http:/www.e-polymers.org, *ISSN* 1618-7229).

The polydispersity index (PDI) is well known to a skilled person and is determined by calculation of the $M_w/M_n$ ratio (weight average molecular weight/number average molecular weight). Polydispersity may be determined by gel permeation or size exclusion chromatography, light scattering measurements, direct calculation from matrix-assisted laser desorption/ionization (MALDI) or from electrospray mass spectrometry.

The residual solvent concentration may be determined by Gas Chromatography (GC). The determination of the residual solvent concentration by GC is well known to a skilled person.

The extinction at 420 nm (yellowness index) may be determined by spectrometry by use of a 12.5% by weight polymer solution in isopropyl alcohol/acetone (60:40 w/w) and a 1 cm cuvette. The test may be performed according to Ph. Eur. 2.2.25.

The total and individual residual monomer contents may be preferably determined by High Pressure Liquid Chromatography (HPLC). The determination of the total and individual residual monomer contents by HPLC is well known to a skilled person.

The assay for the determination of the Alkali value AV may be performed according to Ph. Eur. 2.2.20 "Potentiometric titration" or USP <541>. 0.2 g Polymer (in dependence of the amount of amino methacrylate monomer amount) are dissolved in 96 ml of glacial acetic acid and 4 ml H$_2$O. 0.1 N perchloric acid is used as the titrant (DS=dry substance)

$$AV(\text{mg KOH/g } DS) = \frac{\text{ml } 0.1 \text{ N HClO}_4 \cdot 561}{\text{sample weight (g)} \cdot DS(\%)}$$

EXAMPLES

Analytical Methods

The conversion rate of the monomers to the polymer was determined by calculation of the total monomers used at the beginning of the process in ratio to the residual monomers detected by HPLC in a sample at the end of the polymerization process before the removement of volatile substances.

The molecular weight ($M_w$=average weight molecular weight) of the polymers described here was determined by means of size exclusion chromatography (SEC) as described in detail in Adler et al. (2005) e-Polymers, no. 057, p. 1-11 (http://www.e-polymers.org, ISSN 1618-7229).

The polydispersity index was determined by calculation of the $M_w/M_n$ ratio (weight average molecular weight/number average molecular weight (determined by SEC)).

The residual solvent concentration was determined by Gas Chromatography (GC).

The residual water content was determined by titration according to Karl Fischer (see for instance Eugen Scholz: Karl-Fischer-Titration. Springer-Verlag 1984, ISBN 3-540-12846-8 or K. Schöffski: *Die Wasserbestimmung mit Karl-Fischer-Titration, in: Chemie in unserer Zeit* 2000, 34, 170-175. Abstract).

The extinction at 420 nm (yellowness index) may be determined by spectrometry by use of a 12.5% by weight polymer solution in isopropyl alcohol/acetone (60:40 w/w) and a 1 cm cuvette. The test may be performed according to Ph. Eur. 2.2.25.

The total and individual residual monomer contents were determined by High Pressure Liquid Chromatography (HPLC). Samples were dissolved in methanol. By adding methanol/KH2PO4-buffer (0.625 m, pH 2) 50:50 the polymer was precipitated and the supernatant was analyzed by HMPC using standard reference preparations of the monomers for calibration.

Polymerization Process

The polymerization was carried out in a 100 liter reactor using the following steps The polymerization reactor, a 100 l stirred vessel, was inertized by addition of argon. Stirring was 70 rpm.

The monomer mixture, as shown in table 1 was filled into the reactor.

The temperature of the reactor was raised to about 80° C. When the inside temperature of the reactor had reached about 55° C. 0.2175 Kg of the molecular weight regulator dodecylmercaptan was added.

The polymerization initiator tert-butylperpivalate in a solvent mixture as shown in table 2 was added. The initial dosage of the polymerization initiator solvent mixture (initiator fed) was 0.08 kg/h. After one hour the initiator fed was be adjusted to 0.16 kg/h and after 2.5 hours to 0.36 kg/h.

Directly after the initial initiator fed isopropanol as solvent was added in a dosage of 3.0 kg/h (solvent fed).

The dosing of the initiator fed and of the solvent fed was stopped after 6 hours.

The polymerization reaction was regarded to be finished after 8 hours.

The overall composition of the polymerization mixture that was used respectively consumed during the process is shown in table 3.

Degassing Step

The resulting polymerization syrup was fed into a double screw extruder with co-rotating screws (Manufacturer Berstorff). The extruder had one backward degassing zone and three forward degassing zones. As entrainer 5% by weight of water were added to the polymerization syrup mass. The relevant extrusion parameters are summarized in table 4.

Copolymer

After the extrusion the molten mass was extracted in the form of a string, cooled down by passing a water bath and subsequently comminuted to granules.

The conversion rate of the monomers to the copolymer was 99.4% by weight.

The molecular weight (Mw) was 49.300 g/mol.

The polydispersity index was 2.5.

The residual solvent concentration of isopropanol was 250 ppm by weight.

The residual water content was 0.2% by weight.

The extinction at 420 nm (yellowness index) was 0.019.

The residual monomer content for dimethylaminoethyl methacrylate/butyl methacrylate and methyl methacrylate was 117/169 and 129 ppm by weight.

Tables

TABLE 1

Monomer mixture

| Monomer | kg | % by weight |
|---|---|---|
| Methyl methacrylate (MMA) | 7.2 | 24.3 |
| Butyl methacrylate (BUMA) | 14.7 | 49.4 |
| Dimethylaminoethyl methacrylate (DMAEMA) | 7.8 | 26.3 |
| total | 29.8 | 100 |

TABLE 2

Polymerization initiator in a solvent mixture

| Initiator/solvent | kg | % by weight |
|---|---|---|
| Tert-butylperpivalat | 0.15 | 7.5 |
| Aliphates | 0.05 | 2.5 |
| Isopropanol | 1.8 | 90 |
| Total | 2.0 | 100 |

TABLE 3

Total polymerization mixture as used

| Components | kg | % by weight |
|---|---|---|
| MMA | 7.2 | 14.5 |
| BUMA | 14.7 | 29.5 |
| DMAEMA | 7.8 | 15.7 |
| Isopropanol | 20 | 39.6 |
| Dodecylmercaptan | 0.2 | 0.4 |
| Tert-butylperpivalat | 0.1 | 0.2 |
| Aliphates | 0.04 | 0.02 |
| Total | 50 | 100 |

TABLE 4

Extrusion parameters

| | |
|---|---|
| $T_{PWT}$/° C. | 130 |
| $P_{PWT}$/mbar | ca. 15 bar |
| $T_{backward\ degassing}$/° C. | 140 |
| $P_{backward\ degassing}$/mbar | 1.000 |
| $T_{forward\ degassing\ 1-3}$/ | 180 |
| $P_{forward\ degassing\ 1}$/mbar | 100 |
| $P_{forward\ degassing\ 2+3}$/mbar | 50 |
| Copolymer flow rate g/h | 6.300 |
| Entrainer (H$_2$0) % by weight | 5 |
| Rotation speed/rpm | 220 |

The invention claimed is:

1. A process for preparing a (meth)acrylate copolymer comprising a tertiary amino group, the process comprising:
   polymerizing a polymerization mixture by free-radical polymerization in solution at temperatures from 30 to 120° C. over a period of 2 to 24 hours, thereby obtaining a polymerization syrup,
   degassing the polymerization syrup by distillation or by extrusion, thereby obtaining a degassed polymerization syrup, and
   comminuting the degassed polymerization syrup, thereby obtaining the (meth)acrylate copolymer in a form of a granulate or powder,
   wherein:
   the polymerization mixture of which at least 98% by weight comprises: from 40 to 75% by weight of a monomer mixture, from 0.01 to 5% by weight of at least one polymerization initiator, optionally from 0 to 2% by weight of at least one molecular weight regulator, and from 25 to 50% by weight of a solvent or a solvent mixture, wherein the monomer mixture, the at least one polymerization initiator, and the at least one molecular weight regulator are soluble in the solvent or the solvent mixture;
   the monomer mixture comprises, based on a total amount of the monomer mixture, from 30 to 70% by weight of a $C_1$-$C_4$-alkyl ester of acrylic acid or methacrylic acid, from 70 to 30% by weight of an alkyl ester of acrylic acid or methacrylic acid with an alkyl radical and a tertiary amino group in the alkyl radical, and optionally from 0 to 10% by weight of other copolymerizable vinyl monomers;

in said polymerizing, at least 99% by weight of monomers in the monomer mixture are converted to the (meth)acrylate copolymer; and the (meth)acrylate copolymer has a weight average molecular weight of from 25,000 to 75,000 g/mol, a polydispersity index of from 2.1 to 2.9, and a residual solvent concentration of less than 1,000 ppm by weight.

2. The process according to claim 1, wherein the monomer mixture comprises 10-40% by weight of methyl methacrylate, 10-40% by weight of butyl methacrylate, and 30-70% by weight of dimethylaminoethyl methacrylate.

3. The process according to claim 1, wherein the solvent or the solvent mixture comprises more than 95% by weight of a solvent or a mixture of solvents selected from the group consisting of ethanol, methanol, iso-propyl alcohol, n-butyl alcohol, iso-butyl alcohol, tetrahydrofuran, methyl ethyl ketone, methyl iso-butyl ketone, dioxan, acetone, ethyl acetate and butyl acetate.

4. The process according to claim 3, wherein the solvent or the solvent mixture comprises at least 98% by weight of a combination comprising more than 95% by weight of iso-propyl alcohol, less than 5% by weight of water and less than 1% by weight of aliphatic solvents.

5. The process according to claim 1, wherein the at least one polymerization initiator is dilauryl-peroxide, dimethyl-2-2'-azobis-isobutyrate, tert-butylperpivalate, tert-butylper-2-ethylhexaonat, or any mixture thereof.

6. The process according to claim 1, wherein the at least one molecular weight regulator is dodecylmercaptan.

7. The process according to claim 1, wherein said degassing is performed in a twin screw extruder with two degassing zones at temperatures of from 100 to 200° C. with from 2 to 10% by weight of water added as a carrier to the polymerization syrup.

8. The process according to claim 1, wherein the monomer mixture comprises, based on the total amount of the monomer mixture, from 40 to 60% by weight of the $C_1$-$C_4$-alkyl ester of acrylic acid or methacrylic acid, from 60 to 40% by weight of the alkyl ester of acrylic acid or methacrylic acid with an alkyl radical and a tertiary amino group in the alkyl radical, and optionally from 0 to 10% by weight of other copolymerizable vinyl monomers.

9. The process according to claim 1, wherein the monomer mixture consists of 25% by weight of methyl methacrylate, 25% by weight of butyl methacrylate and 50% by weight of dimethylaminoethyl methacrylate.

10. The process according to claim 1, wherein the polymerization mixture comprises: from 40 to 75% by weight of the monomer mixture, from 0.01 to 0.5% by weight of the at least one polymerization initiator, from 0.1 to 2% by weight of the at least one molecular weight regulator, and from 25 to 50% by weight of the solvent or the solvent mixture.

11. The process according to claim 1, wherein the polymerization mixture comprises: from 50 to 70% by weight of the monomer mixture, from 0.01 to 0.5% by weight of the at least one polymerization initiator, from 0.1 to 2% by weight of the at least one molecular weight regulator, and from 25 to 50% by weight of the solvent or the solvent mixture.

12. The process according to claim 1, wherein the polymerization mixture comprises: from 50 to 70% by weight of the monomer mixture, from 0.05 to 0.3% by weight of the at least one polymerization initiator, from 0.2 to 1% by weight of the at least one molecular weight regulator, and from 35 to 45% by weight of the solvent or the solvent mixture.

13. The process according to claim 1, wherein said polymerizing occurs at temperatures from 50 to 100° C.

14. The process according to claim 1, wherein said polymerizing occurs at temperatures from 55 to 90° C.

* * * * *

UNITED STATES PATENT AND TRADEMARK OFFICE
CERTIFICATE OF CORRECTION

| | | |
|---|---|---|
| PATENT NO. | : 8,859,697 B2 | |
| APPLICATION NO. | : 13/876277 | |
| DATED | : October 14, 2014 | |
| INVENTOR(S) | : Christian Meier et al. | |

It is certified that error appears in the above-identified patent and that said Letters Patent is hereby corrected as shown below:

On the title page, Item (75), the 3$^{rd}$ Inventor's City of Residence is incorrect. Item (75) should read:

--(75) Inventors: Christian Meier, Darmstadt (DE);
Andreas Weber, Frankfurt (DE);
Johannes Vorholz, Alzenau (DE);
Alpertunga Kueksal, Nuremberg (DE);
Andreas Klosendorf, Bad Schwalbach (DE);
Pamela Boehmann, Weiterstadt (DE);
Marcus Denger, Brensbach (DE);
Norbert Hoffmann, Griesheim (DE);
Nikolaos Papadopoulos, Ginsheim-Gustavsburg (DE)--

Signed and Sealed this
Tenth Day of March, 2015

Michelle K. Lee
*Deputy Director of the United States Patent and Trademark Office*